United States Patent Office 3,019,478
Patented Feb. 6, 1962

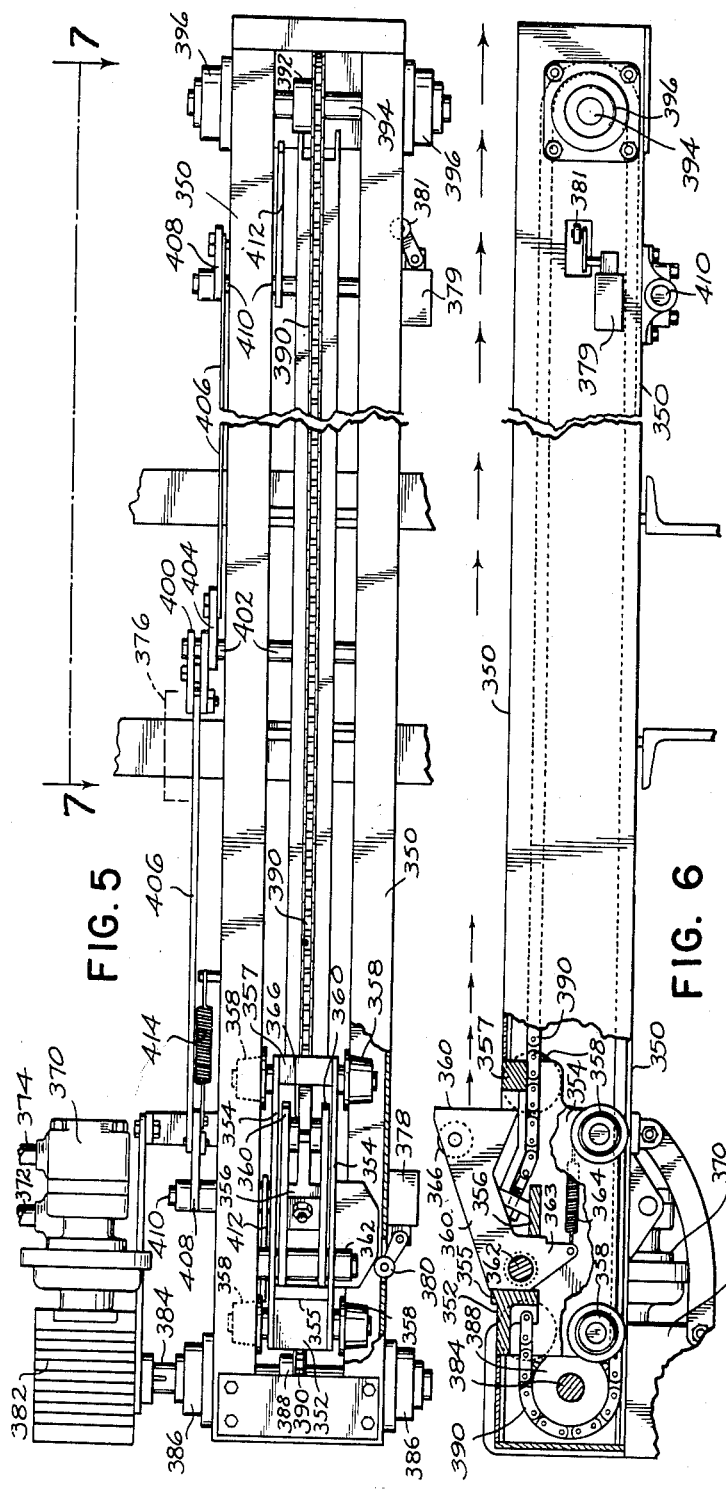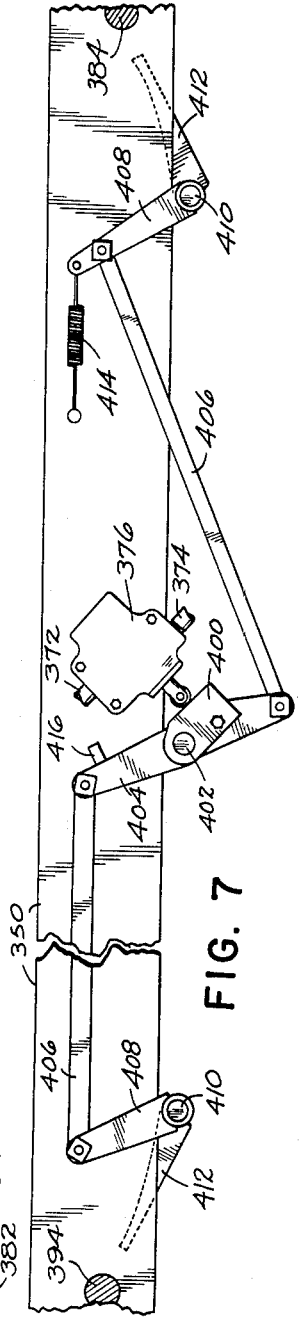

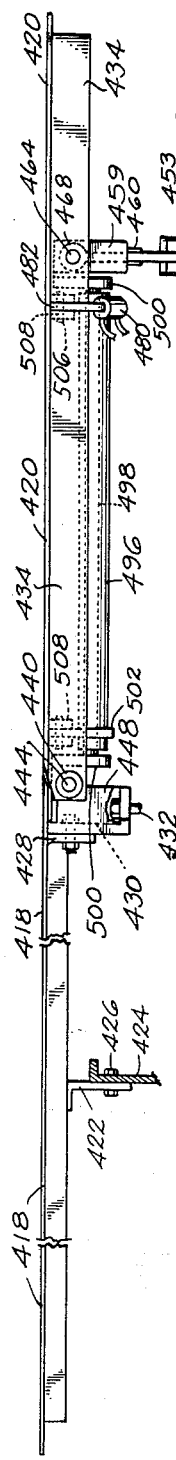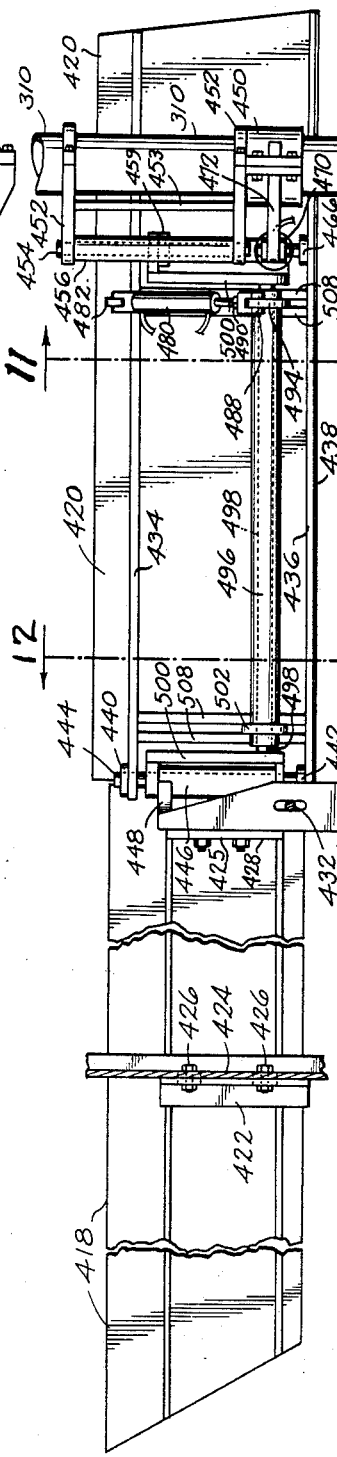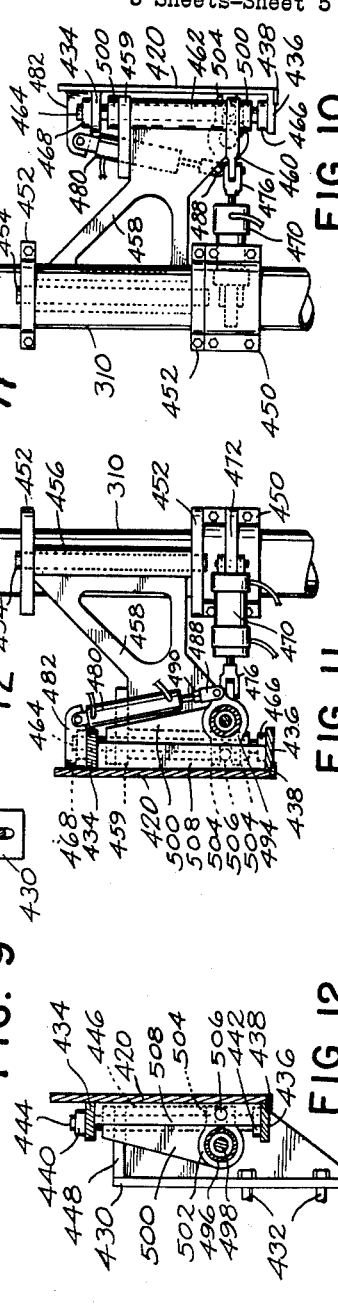

3,019,478
MAT EDGE PRESS APPARATUS
Harold E. Erickson, Auburn, and Norman E. Nelson, Charles V. Nelson, and Dale L. Schubert, Tacoma, Wash.; said Erickson assignor to said Schubert and said Norman E. Nelson and said Charles V. Nelson assignors, by mesne assignments, to Industrial Development Co., Tacoma, Wash., a corporation of Washington
Original application Mar. 21, 1957, Ser. No. 647,589. Divided and this application Sept. 2, 1958, Ser. No. 758,353
6 Claims. (Cl. 18—4)

This invention relates to mat handling apparatus and is a division of our prior application Serial No. 647,589, filed March 21, 1957, now Patent No. 2,989,774, granted June 27, 1961. It pertains particularly to apparatus for handling compactable mats composed of small pieces of lignocellulose.

In the manufacture of hardboard and other composition board products, lignocellulose particles are first mixed with adhesive and formed into mats by suitable felting apparatus. For convenience in handling as well as for application in a subsequent hot pressing operation, the mats are formed directly upon, or are transferred to, metal caul plates of suitable dimensions. The caul plates and superimposed mats then are conveyed to a press loader which loads them into a multi-opening hot press. There the mats are pressed to the desired density.

Several serious difficulties are inherent in the foregoing sequence of operations. In the first place, the edges of the mats should be kept uniform so that the edges of the final consolidated products also will be uniform. This is difficult of accomplishment, however, since the mats are several inches thick and composed of loosely piled particles which may break away as the mats are being conveyed to the press.

One widely practiced solution to this difficulty has been to make oversize boards which are trimmed to the stipulated dimensions. Such a procedure is wasteful, however, for the reason that the trim which comprises from 5 to 10% of the lignocellulose starting material, having been consolidated under the combined influence of heat and pressure, can not be recycled to the production of a further quantity of composition board and conventionally is burned. This obviously causes a significant operating loss.

It also has been proposed that the handling of the mats between the felter and press may be facilitated by prepressing them to a coherent, self-sustaining form. It then is possible to move them into the press loader, and thence into the press, without substantial loss of the particles of which they are formed.

This procedure is subject to the disadvantage, however, that even though the mats are prepressed, the edges of the consolidated boards made from them are still irregular and must be trimmed with attendant loss of material. Also, it is difficult to introduce the incoherent, loose mats into a prepress without some of the component particles working their way beneath the caul plates. Then when pressure is applied the caul plates are dented and eventually made unfit for use.

Still another difficulty inherent in the formation of fibrous mats and their conversion into consolidated products resides in the fact that prepressing operations such as are outlined above are time consuming and as a consequence it is not possible to employ a felter of high capacity to full advantage in a progressively moving plant production line.

Accordingly it is the general purpose of the present invention to provide apparatus for handling mats of varying dimensions, the application of which results in the production of prepressed mats having square, uniform edges at a rate sufficiently high to keep pace with a high capacity felter. The mats thus produced then are suitable for loading rapidly into a press loader and thence into a hot press for consolidation into boards having edges of uniform density which require little trimming. In this manner a very substantial loss of material is virtually eliminated.

The manner in which the foregoing and other objects of this invention are accomplished will be apparent from the accompanying specification and claims considered together with the drawings wherein:

FIG. 5 is a plan view of a driving unit for conveying work units on the edge press of FIGS. 2 and 3, partly in section;

FIG. 6 is a view in side elevation, of the drive unit of FIG. 5;

FIG. 7 is a detail view in side elevation of a control unit employed in conjunction with the drive unit of FIGS. 5 and 6, looking in the direction of line 7—7 of FIG. 5;

FIG. 8 is a plan view of a deckle plate assembly employed in conjunction with the edge press of FIGS. 2 and 3;

FIG. 9 is a view in side elevation of the deckle plate assembly of FIG. 8;

FIG. 10 is an end view of the deckle plate assembly;

FIGS. 11 and 12 are sectional views taken along lines 11 and 12 of FIG. 9.

Figure 1:
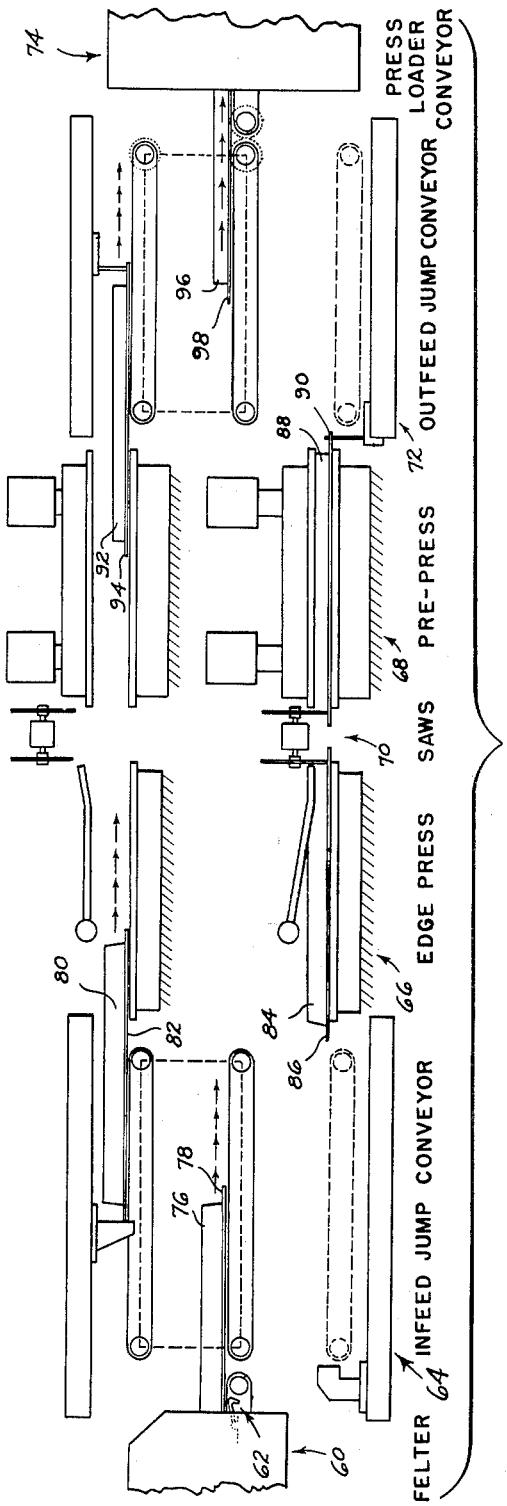
FIG. 1 is a schematic view illustrating a mat edge press apparatus and other units with which the present edge press may be employed.

Considering the foregoing in greater detail and with particular reference to the drawings:

Various operational units which may be employed with the herein described invention are illustrated schematically in FIG. 1. A felter indicated generally at 60 deposits pieces of lignocellulose or other material on metal caul plates until they are built up into mats of suitable thickness. These mats are conveyed successively out of the felter on a suitable conveyor at a relatively rapid rate. As they reach the outfeed end of the conveyor they are impelled forwardly by impelling apparatus 62 until they are located precisely on an infeed jump conveyor 64.

The jump conveyor has the function indicated above of dividing the rapidly moving mat production line into two lines which move at relatively reduced over-all rates. The mats in these two lines then are transferred to a double edge press 66 having for its function the prepressing of the leading edges of the mats so that they may be guided into a double prepress unit 68. The latter unit prepresses or compacts the remaining area of each mat to the desired thickness.

While adjacent mats are being prepressed in units 66, 68 they are acted upon by traveling saws 70 which trim and square off the trailing edge of the leading mat and the leading edge of the following mat. During these operations the side edges of the mats may be retained between side deckles, not illustrated in FIG. 1 but to be described in connection with subsequent figures.

After the mats have been prepressed and trimmed, they are transferred to a second jump conveyor 72 which receives mats alternately from the upper and lower units of prepress 68 and loads them into a press loader conveyor 74. This carries them to an injector which, in turn, delivers them to the loader of a hot press of suitable design where they are consolidated to the desired density and thickness.

Thus in the schematic illustration of FIG. 1 there are depicted a number of work units in various stages of processing. The work unit comprising mat 76 on caul plate 78 is just leaving felter 60 and entering the lower unit of jump conveyor 64. Mat 80 on caul plate 82 is being transferred from the upper unit of conveyor 60 to the upper unit of edge press 66.

Mat 84 on caul plate 86 is depicted in the process of having its leading edge prepressed in the lower unit of edge press 66. Mat 88 on caul plate 90 is illustrated in position in prepress 68. The trailing edge of mat 88 and the leading edge of mat 84 are being trimmed off by the lower unit of cut-off saws 70. While this is occurring mat 92 on caul plate 94 is being transferred from the upper unit of prepress 68 to the upper unit of jump conveyor 72. Finally, mat 96 on caul plate 98 is being transferred from the lower unit of jump conveyor 72 into press loader conveyor 74.

*The edge press unit*

The edge press selectively compacts the leading end portions of the mats. It includes a press platen, conveying means positioned for stationing the leading end of each mat in turn within the operating range of the platen, and drive means connected to the platen for alternately advancing and retracting it with respect to the mat. This compacts the leading end thereof to the predetermined thickness. The conveying means thereupon removes the mat to the next operating station. Deckles are provided for confining the side edges of the mat during this sequence.

The edge press unit indicated generally at 66 in FIG. 1, is illustrated in detail in FIGS. 2–12 inclusive of the drawings. It is positioned immediately downstream from infeed jump conveyor 64 for receiving the work units from the discharge end thereof. Its frame includes the uprights 310, the horizontal members 312, and the transverse members 314.

It also includes upper and lower banks of longitudinally divided, horizontal rollers 316 upon which the work units are pushed from the infeed jump conveyor and on which they are advanced to communicating, longitudinally divided bed plates 317. Spaced, parallel deckle plates are located one on each side of the respective sets of rollers for retaining the side edges of the work units, which in the illustrated form of the invention comprise compressible mats of fibrous particles.

A platen 320 is supported and reinforced by a frame including spaced, parallel, side plates 322, top plate 324 and face plate 326. This frame is pivotally mounted on arms 328, the outer ends of which are pivoted in a selected one of two or more positions of vertical adjustment by pins 330 inserted in openings through the arms and through standards 332 extending upwardly from longitudinal frame members 312.

Platen 320 comprises an angular metal plate having a removable end strip 321 and removable side strips 323 to accommodate mats of varying dimensions. Platen 320 is formed with a leading section adapted to lie horizontally when the platen is in pressing position and a trailing section which slopes gradually upwardly. Accordingly, when the platen is applied, it presses the leading end of the mat substantially flat, the portion of the mat immediately behind tapering upwardly toward the rear. This avoids fracturing the mat and makes possible introducing it easily into subsequent operating units.

The platen assembly is reciprocated between raised and lowered positions by means of fluid operated cylinders 334. The lower ends of these cylinders are pivotally attached to the frame by means of pins 336. The piston rods of the cylinders are provided with clevises 338 which are connected through pins 340 to extensions of the platen frame.

Figure 2:
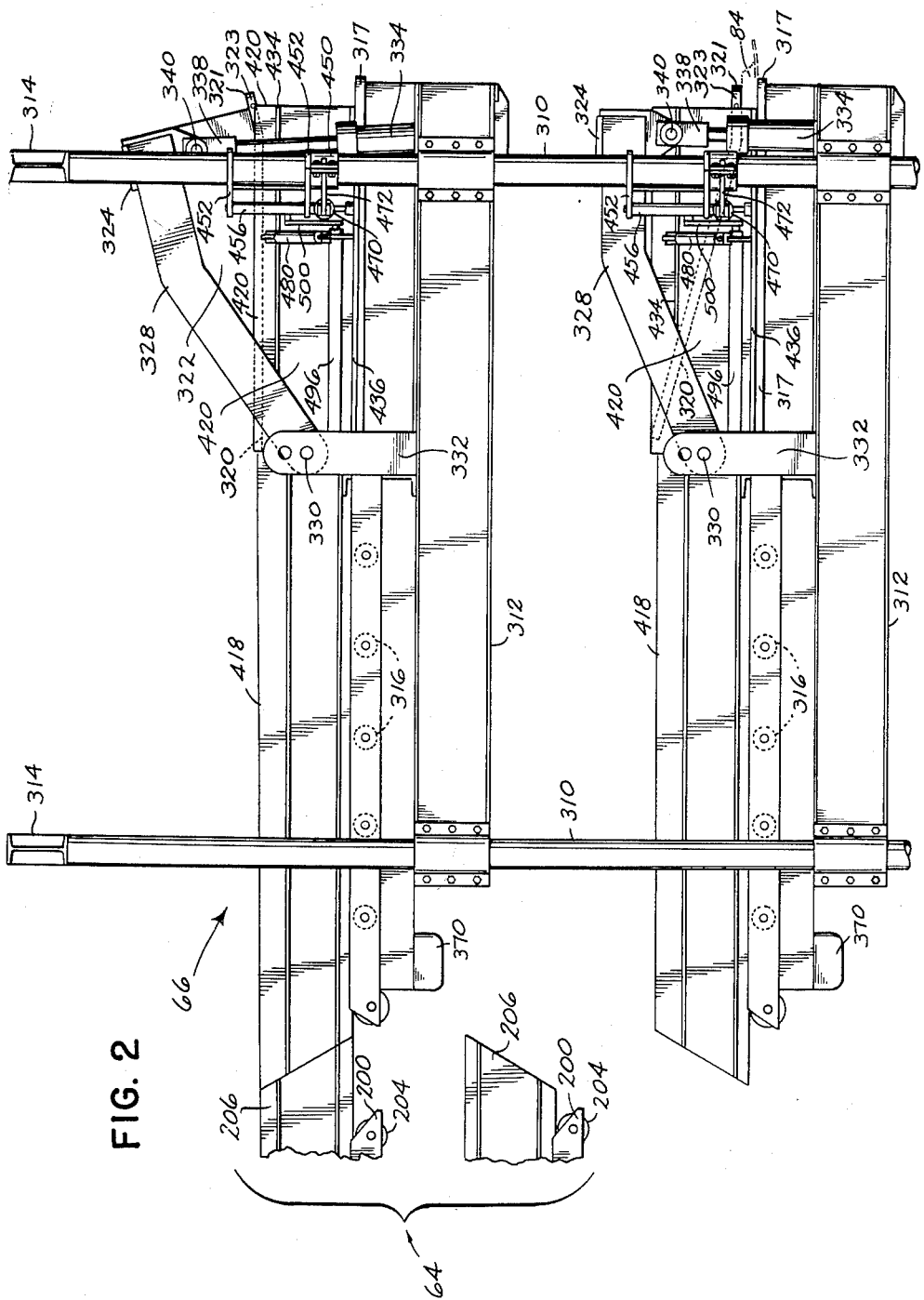
FIG. 2 is a view in side elevation of the edge press.
Figure 3:
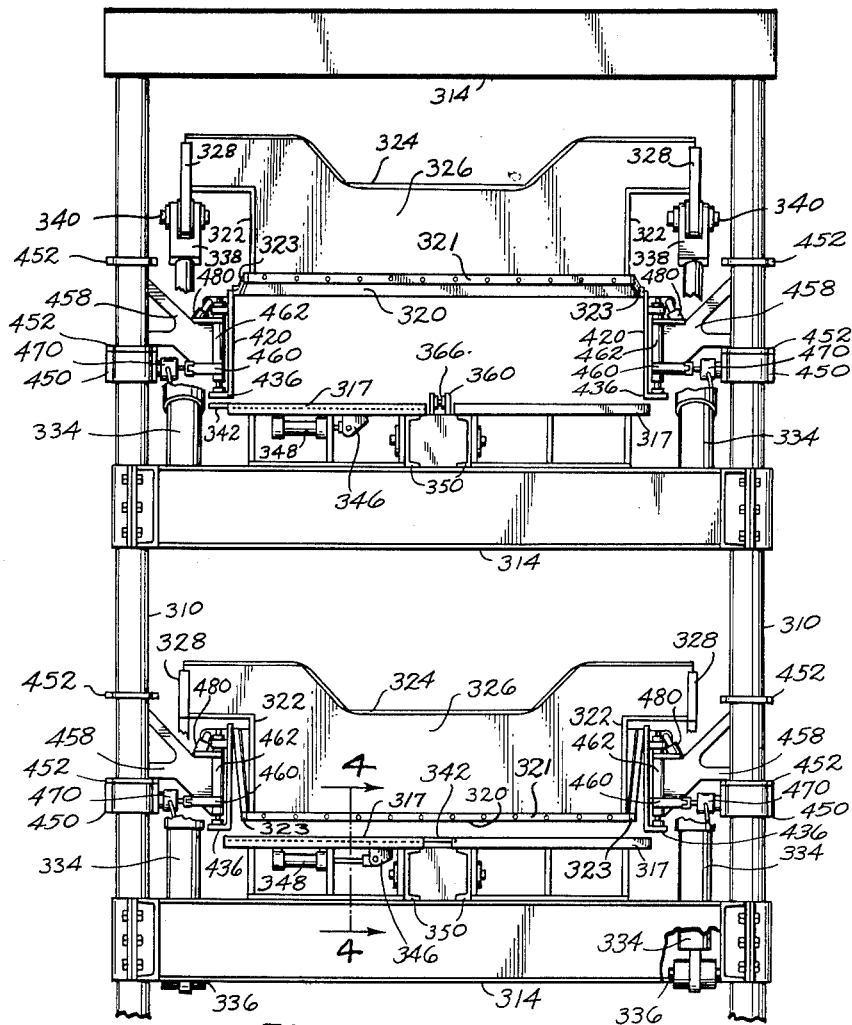
FIG. 3 is a view in end elevation of the edge press of FIG. 2.
Figure 4:
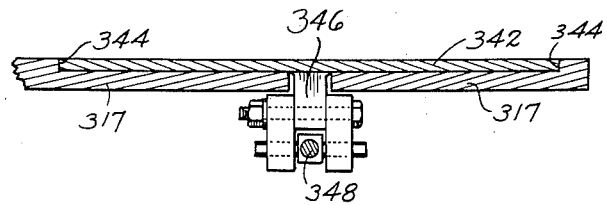
FIG. 4 is a detail sectional view taken along line 4—4 of FIG. 3.

Hence as the piston rods of cylinders 334 are reciprocated, the platen is moved between the retracted position illustrated in the upper unit of FIGS. 2 and 3, and the working position illustrated in the lower unit thereof. It is to be noted that when the platen is in the latter position it compresses the mat firmly against the caul plate, which projects slightly beyond the apparatus. Hence the irregular leading edge of the mat may be trimmed off as will be described hereinafter.

To prevent bending the caul plates in the opening between the two halves of longitudinally divided bed plate 317 when pressure is applied by the platen, there is provided a sliding plate 342 (FIG. 4) which moves in a guideway 344. To the underside of the plate is welded a tab 346 which extends through a transverse slot in bed plate 317. The piston rod of a cylinder 348 is connected to the tab.

Accordingly, when a pressing operation is to be performed, plate 342 may be moved across the opening between the divsions of the bed plate, forming a continuous surface on which the caul plate carrying the compressible mat is supported, as in the lower prepress unit of FIG. 3. However, when it becomes necessary to move the caul plate off the unit, the plate may be moved out of the way, as in the upper prepress unit of that figure.

The work units supported on the longitudinally divided sets of rollers 316 and bed plate 317 are driven through the apparatus by a drive illustrated particularly in FIGS. 5, 6 and 7. The drive unit is mounted on a pair of spaced, parallel tracks 350 extending longitudinally of the apparatus beneath the opening between the rollers and bed plate divisions.

A car or trolley is mounted for travel back and forth on the tracks. It comprises a base plate 352, a pair of spaced side plates 354, and cross pieces 355, 356, 357. Wheels 358 are rotatably mounted on the trolley and roll on tracks 350.

A resiliently mounted arm 360 is carried by the car for engagement with the work units. It comprises a pair of spaced, parallel bars pivotally mounted on a shaft 362 carried between side plates 354. The arm is formed with an extension 363 to which one end of coil spring 364 is connected. The other end of the spring is attached to a frame member of the car.

Hence the spring maintains the arm normally in an elevated position in which its forward end lies in the path of travel of the work units and therefore can engage the same when the car is driven forwardly. However, when the car is driven towards the rear, the arm is depressed against the resilient force of spring 364 by contact with the under surface of the work units. The upper surface of the arm then slides along the under surface of the work unit on rollers 366 provided for that purpose.

The trolley carrying arm 360 is driven from a suitable power source such as the reversible hydraulic motor 370. This motor is fed with fluid under pressure through lines 372, 374. It is controlled by a two-way deceleration valve 376 and reversing switches 378, 379. The latter switches are mounted on tracks 350 at the extreme limits of travel of the trolley and are operated by spring pressed contact arms 380, 381.

Motor 370 is coupled through gear box 382 to drive shaft 384. This shaft is rotatably mounted across the infeed end of tracks 350 in bearings 386. A sprocket 388 is keyed to the shaft. A discontinuous chain 390 engages the sprocket and extends the length of the drive unit. The other end of this chain is supported by a sprocket 392 keyed to idler shaft 394 journaled in bearings 396. The ends of chain 390 are bolted to trolley cross plates 355, 356.

As has been indicated above, the reciprocative movement of the trolley is controlled by the combined action of deceleration valve 376, which reduces the flow of oil through motor 370 and limit switches 378, 379 which reverse the motor. The stem of deceleration valve 376 is actuated by a cam 400 which is fast to a rock shaft 402. A crank arm 404 is keyed at about its midpoint to the same shaft. The ends of crank arm 404 are connected through links 406 to cranks 408. The latter in turn are rigid to rock shafts 410 to which fingers 412 are fixed.

Fingers 412 are maintained in a normally raised position wherein they lie in the terminal path of travel of the trolley by means of a spring 414 which interconnects a frame member and an extension of one of cranks 408. The extent of such elevation of the fingers is limited by stop 416. Hence as the trolley moves back and forth on tracks 350 it alternately contacts the forward and rearward fingers 412, depressing them and operating the lever system to advance cam 400 against the stem of valve 376, thereby operating the valve and decelerating the trolley.

At the beginning of the cycle of operation of the edge press unit, the trolley bearing arm 360 is stationed at the extreme infeed end of the unit with the arm in its elevated position. The conveyor drive of the previously described infeed jump conveyor is operated to push the work units onto rollers 316 and bed plate 317. As the work units traverse the arm, they depress it against the tension of spring 364. Then when the work units have passed completely over the arm, it springs upwardly into operating position.

After the work unit has been pressed by the action of platen 320, motor 370 drives chain 390 in a forward direction, moving the trolley bearing upraised arm 360 forwardly and pushing the work unit off the edge press onto the next operating unit. As the trolley reaches the end of its forward travel, it contacts successively forward finger 412 and switch 378, whereupon its movement is decelerated and then reversed, whereupon it returns to its starting position ready for the introduction of another work unit into the edge press.

As has been indicated above, the presently described edge press is provided with deckle plates having for their function confining the side edges of the work units introduced into the edge press so that they will be defined uniformly and sharply. Stationary deckle sections 418 are provided at the infeed end of the edge press. Deckle sections 420 which move both upwardly and outwardly are provided at the outfeed end of the press to separate them from the work units after the operation of platen 320, thereby permitting their progression through the edge press. The construction of the deckle assembly on one side of the press is illustrated in FIGS. 8–12 inclusive.

Stationary deckle section 418 is provided with slotted flange 422 secured to slotted upright frame member 424 by bolts 426. The stationary deckle section also carries a vertical flange 428 which is bolted to the slotted upright frame member 430. Vertical frame member 430 is secured to adjacent frame members of the unit by means of bolts 432.

The infeed end of movable deckle 420 is supported by the outfeed end of stationary deckle 418 and the outfeed end of the movable deckle is supported adjustably on post 310 in a manner to be described below. Hence the entire deckle assembly is mounted on the frame of the unit adjustably in a vertical direction as required to position the deckle plate properly for confining the side edge of the work unit.

The infeed end of movable deckle section 420 is hinged to the outfeed end of stationary deckle sections 418 to permit the outfeed end of the former deckle section to be swung outwardly, in gate-like fashion, by an amount sufficient to separate the deckle section from the work units after operation of platen 320.

To this end the deckle section is provided with the longitudinally extending, horizontal flange 434, foot plate 436, and wear plate 438. Pad 440 is mounted on the infeed end of flange 434. Pad 442 is mounted on the corresponding end of foot plate 436. Post 444, which acts as a hinge pin, is welded to pads 440, 442 and also to flange 434. Encircling post 444 is a stationary sleeve 446 which is rigidly connected to frame member 430 by plate 448. In this manner the inner end of movable deckle section 420 is hingedly connected to the fixed deckle section.

The outfeed end of movable deckle section 420 is supported by a fixed collar 450 clamped to post 310. A pair of spaced rotatable collars 452 are also mounted on the post, the lower collar of this pair bearing against fixed collar 450.

Collars 452 are formed with horizontal extensions which are interconnected by a web member 453 and which mounts a fixed pin 454. A sleeve 456 is rotatably mounted on this pin. It supports a bracket 458.

Horizontal plates 459, 460 are welded to the opposite sides of the inner end of the bracket and a sleeve 462 is fixed between these plates and the bracket. A post 464 which serves as a hinge pin is journaled in the sleeve. The lower end of the post is fixed in a socket 466 which is welded to foot flange 436. The upper end of the post penetrates an opening in flange 434 and a registering opening in pad 468 welded thereto, thus forming a hinge upon which the outer end of deckle section 420 turns.

Angular movement of the deckle section is obtained by the action of a short stroke, fluid operated cylinder 470. The rear end of this cylinder is connected pivotally to a tab 472 welded to collar 450 which is clamped to post 310. Its piston rod is connected through a pin and clevis 476 to an extension of plate 460.

Thus as the piston rod of cylinder 470 moves in and out, the outer ends of deckle plate sections 420 swing inwardly and outwardly. During this movement, collars 452 rotate about post 310, sleeve 456 about pin 454 and sleeve 462 about post 464.

Deckle section 420 is reciprocated in a vertical plane by means of cylinder 480. The base of this cylinder is pivotally connected to a tab 482 extending outwardly from the face of the deckle. Its piston rod is threaded into a clevis 488 and lock nut 490 for adjustment of the relative positions of the clevis and cylinder.

Clevis 488 is pivotally connected to a radially extending crank projection of radial flange 494 which is rigid to a hollow shaft 496. This shaft is rotatably mounted about a horizontal rod 498 from which it is spaced by suitable spacing elements. The respective ends of rod 498 are supported by brackets 500 having at right angles to the body thereof perforated projections which encircle posts 444, 462 respectively.

The infeed end of hollow shaft 496 carries a rigidly fixed radial flange 502 which corresponds to flange 494 on the outfeed end of the shaft. Both of flanges 494, 502 have inwardly extending yokes 504. The yokes in turn engage pins 506 extending transversely between spaced vertical plates 508 running between horizontal flange 434 and foot 438 on the outer face of deckle section 420. Accordingly, as piston rod 486 of cylinder 480 is extended and retracted by predetermined strokes, hollow shaft 496 is rocked back and forth about rod 498. This moves yokes 504 angularly which in turn imparts a vertically reciprocating movement to deckle plate section 420.

The operation of the edge press unit whereby the leading edges of the work units are prepressed to a predetermined thickness is as follows:

The work units comprising, for example, lignocellulose mats carried on metal caul plates, are introduced alternately to the upper and lower units of the edge press 66 by the impelling elements of the infeed jump conveyor 64. Plate 342 covers the opening between divided bed plate sections 317, and the outfeed deckle sections 420 are shifted inwardly and downwardly to restrain the side edges of the mat.

Cylinders 334 then are retracted, lowering angled press platen 320 into engagement with the leading edge of the mat and pressing it to the contour apparent in FIG. 2.

While the leading edge of the mat is thus compressed, it may be squared off by the operation of trimming saws as will be considered hereinbelow.

After the pressing operation has been completed, cylinders 334 are extended to elevate the press platen. Cylinders 470 are retracted to swing the outfeed deckle sections 420 about posts 444 and thus separate them laterally from the consolidated mat. Cylinders 480 are extended, working the crank projections on flanges 494 carried by horizontal hollow shafts 496. This rotates the shafts, elevating the yokes 504 and hence the deckle sections until the foot plates thereon clear the work units against which they bear during the pressing cycle.

Cylinder 348 is retracted, withdrawing plate 342 from across the opening between the two sections of bed plate 317. The trolley bearing pushing arms 360 then is advanced by the operation of hydraulic motor 370. Thereupon the arms push the work into the next unit of the herein described apparatus, i.e. the prepress, after which the trolley is withdrawn preliminary to introduction of another work unit into the edge press.

Operation

The overall operation of the herein described mat handling apparatus is as follows:

Assuming that the infeed jump conveyor 64 is in the elevated position illustrated in FIG. 1, a first work unit which may comprise a lignocellulose mat resting on a metal caul plate is ejected from a high capacity felter 60 and placed on the lower unit of the infeed jump conveyor. There it is located precisely by the operation of impeller 62.

The jump conveyor then is indexed downwardly to its dotted line position and the work unit transferred to edge press 66. While this is occurring a second work unit is ejected from felter 60 onto the upper deck of the jump conveyor.

The jump conveyor then is indexed upwardly until the upper level thereof registers with the upper level of edge press 66 so that the work unit may be transferred thereto. The jump conveyor thus shuttles back and forth between its raised and lowered positions, receiving work units from felter 60 and delivering them alternately to the upper and lower levels of the edge press.

After the first work unit has had its leading edge consolidated in edge press 66, it is transferred to prepress 68. A following work unit thereupon is located on edge press 66. The balance of the first unit is consolidated in the prepress while the leading edge of the following unit is pressed in the edge press. While the two work units are confined in the prepress and edge press respectively, trim saws 70 trim off the trailing edge of the first unit and the leading edge of the following unit.

Outfeed jump conveyor 72 is indexed to its down position and the first work unit drawn into it. While the next work unit is following the first into prepress 68, the outfeed jump conveyor is indexed to its raised full line position whereupon the first work unit is transferred from the outfeed jump conveyor into the press loader conveyor whence it passes to a hot press for final consolidation.

While the foregoing sequence is occurring, a similar sequence is occurring in the upper decks of the various units of the apparatus with the result that the stream of work units emanating from felter 60 is divided into two lines by infeed jump conveyor 64 and, after prepressing and trimming, the two lines are re-united in a single line by outfeed jump conveyor 72 which delivers them to the press loader conveyor.

The sequence thus is repeated continuously to provide a rapid and effective procedure for handling compactable mats. This procedure has the advantages of providing prepressed mats which are self-sustaining and may be handled without danger of breakage in subsequent operations. Furthermore, the leading edges, trailing edges and side edges of the mats all are sharply defined and uniform so that consolidated products made therefrom likewise will have sharply defined uniform edges.

Since a trimming operation is carried out on the mats before their consolidation, the unused trim may be collected and recycled without loss for fabrication into further mats. This is not possible if the mats are trimmed after hot pressing, and effectuates a substantial saving of raw material.

Since the leading edges of the mats are prepressed in an edge press in a preliminary operation, the mats may be introduced into the prepress with little danger of pieces of material working under the caul plates and hence with little danger of denting the latter upon operation of the prepress. Also, the apparatus is versatile and adaptable to handling mats of varying length, width and thickness, produced by a felter or other apparatus of high capacity.

It is to be understood that the form of our invention herewith shown and described is to be taken as a preferred example of the same, and that various changes in the shape, size and arrangement of parts may be resorted to without departing from the spirit of our invention or the scope of the subjoined claims.

Having thus described our invention, we claim:

1. Apparatus for selectively compacting a leading end portion only of a compactable mat, said apparatus comprising: a frame, a bed plate on the frame, a press platen having a leading section arranged to lie substantially parallel to the bed plate when in pressing position and a trailing section which slopes away from the bed plate in the trailing direction thereof, conveying means proportioned and arranged to move the mat to a position at which a leading end portion only of the mat is located within the operating range of the platen, drive means connected to the platen for alternately advancing and retracting it with respect to the mat, thereby compacting said leading end portion to a predetermined thickness with a trailing portion of the mat immediately behind the leading portion being compacted to the lesser degree determined by the slope of the trailing section of the platen, and second conveying means arranged to move the entire mat forwardly across the bed plate beyond the operating range of the platen.

2. The apparatus of claim 1 wherein the platen comprises an angular plate and wherein the drive means therefor comprises a fluid operated cylinder, one end of the plate being pivotally connected to the frame of the apparatus and the other being pivotally connected to the cylinder.

3. The apparatus of claim 1 wherein the second conveying means comprises a track positioned adjacent the apparatus longitudinally thereof, a trolley mounted on the track, drive means for reciprocating the trolley, and a resilient arm pivotally mounted on the trolley for engaging the work upon advancement of the trolley and for disengagement therefrom upon retraction of the same.

4. The apparatus of claim 1 including spaced longitudinal deckle plates arranged on each side of the platen for confining the side edges of the mat, means for reciprocating the deckle plates in a vertical plane and for oscillating their outfeed ends angularly in a horizontal plane.

5. The apparatus of claim 1 wherein the platen is provided with edge strips, and with means for removably attaching the strips to the edges of the platen when it is desired to vary the area thereof to accommodate mats of different areas.

6. The apparatus of claim 1 wherein the bed plate is divided to provide a longitudinal guideway for the second conveying means, a cover plate mounted slidably on the bed plate, and power means connected to the cover plate for moving the latter in one direction to cover the guideway during the pressing operation and in another direction to expose the guideway for operation of the second conveying means.

References Cited in the file of this patent

UNITED STATES PATENTS

| | | |
|---|---|---|
| 1,603,226 | Wentz | Oct. 12, 1926 |
| 1,736,935 | Navarre | Nov. 26, 1929 |
| 2,231,254 | Cleveland | Feb. 11, 1941 |
| 2,297,504 | Salvaneschi | Sept. 29, 1942 |
| 2,719,328 | Patton et al. | Oct. 4, 1955 |

FOREIGN PATENTS

| | | |
|---|---|---|
| 105,854 | Australia | Nov. 16, 1938 |
| 697,321 | Great Britain | Sept. 23, 1953 |
| 779,368 | Great Britain | July 17, 1957 |
| 60,079 | Holland | Oct. 15, 1947 |